United States Patent
Roβkamp et al.

(10) Patent No.: US 8,962,169 B2
(45) Date of Patent: Feb. 24, 2015

(54) BATTERY PACK FOR A HAND-GUIDED POWER TOOL

(75) Inventors: Heiko Roβkamp, Adelberg (DE);
Harald Mang, Winnenden (DE);
Matthias Müller, Remshalden (DE);
Volker Reber, Michelbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 552 days.

(21) Appl. No.: 12/709,553

(22) Filed: Feb. 22, 2010

(65) Prior Publication Data
US 2010/0221591 A1 Sep. 2, 2010

(30) Foreign Application Priority Data
Feb. 27, 2009 (DE) .......................... 10 2009 012 183

(51) Int. Cl.
*H01M 2/10* (2006.01)
*H01M 10/052* (2010.01)

(52) U.S. Cl.
CPC .......... *H01M 2/1022* (2013.01); *H01M 2/1055* (2013.01); *H01M 10/052* (2013.01)
USPC ............................................. 429/99; 429/96

(58) Field of Classification Search
CPC H01M 10/052; H01M 2/1022; H01M 2/1055
USPC ......................................................... 429/99
See application file for complete search history.

(56) References Cited

U.S. PATENT DOCUMENTS

| 6,007,939 | A | 12/1999 | Clowers |
| 2004/0081885 | A1 | 4/2004 | Ziegler et al. |
| 2007/0182369 | A1* | 8/2007 | Gerber et al. .................. 320/112 |
| 2009/0139781 | A1* | 6/2009 | Straubel ...................... 180/65.1 |

FOREIGN PATENT DOCUMENTS

| DE | 20023629 U1 | 5/2005 |
| DE | 102007017980 A1 | 10/2008 |
| EP | 0 676 819 A2 | 10/1995 |
| EP | 1 780 818 A2 | 5/2007 |
| JP | 2001-143678 A | 5/2001 |

* cited by examiner

Primary Examiner — Gary Harris
(74) Attorney, Agent, or Firm — Gudrun E. Huckett

(57) ABSTRACT

An exchangeable battery pack for an electric device has a housing with a first end face and a second end face opposite the first end face, wherein the first end is open. A housing cover closes off the first end face. Battery cells are disposed in the housing. Cell connectors electrically connect the cells with one another. An external electrical connector is disposed on the second end face. All of the battery cells are connected to the external electrical connector. The battery cells are charged and discharged through the external electrical connector. A cell holder secures several of the battery cells. An inner positional securing element is provided on an inner side of a sidewall of the housing and the cell holder interacts with the positional securing element.

18 Claims, 7 Drawing Sheets

BATTERY PACK FOR A HAND-GUIDED POWER TOOL

BACKGROUND OF THE INVENTION

The invention relates to an exchangeable battery pack for an electric device, in particular for a portable hand-guided power tool such as a hedge trimmer, a motor chain saw, a brush or grass trimmer or the like, comprising a housing in which a plurality of battery cells is arranged, wherein the battery cells are connected to one another electrically by cell connectors and are connected to a common external electrical connector by means of which the cells are charged and discharged.

U.S. 2004/0081885 A1 discloses a battery pack for electric power tools that has a battery pack housing in which a plurality of battery cells is arranged. The cells are electrically connected to one another by cell connectors and are to be charged and discharged by an external electrical connector.

The cells are inserted directly into the battery pack housing and electrically connected; maximally possible number of battery cells is inserted into the housing interior.

SUMMARY OF THE INVENTION

It is an object of the present invention to provide an exchangeable battery pack for an electric device that is producible in a simple and inexpensive way and can be furnished with a number of battery cells matched to the respective use of the battery pack.

In accordance with the present invention, this is achieved in that the battery pack housing is open at one end face, the end face is closed off by a housing cover and the opposite end face is provided with the external electrical connector, wherein several battery cells are secured in a common cell holder and wherein the cell holder interacts with at least one inner positional securing element that is provided on an inner side of a sidewall of the battery pack housing.

The housing of the battery pack is open at one end face so that it can be furnished through this open end face with battery cells. On the oppositely positioned end face the electrical connector is provided. By employing a cell holder as proposed by the present invention, the battery cells of the battery pack are not arranged within the battery pack housing itself but are secured by means of the cell holders that are positionally fixed, in turn, in the housing of the battery pack. Thus, the number and arrangement of the battery cells can be determined by the cell holders without the battery pack housing itself having to be modified. The battery pack according to the invention, with unchanged housing structure, can be configured in a simple way to accommodate different numbers of cells and therefore various voltage ranges and power ranges.

The positional securing elements are expediently positioned on opposed inner sides of the sidewalls of the battery pack housing wherein a positional securing element on one sidewall is displaced relative to the positional securing element of the opposed sidewall. In this way, a rotational position orientation of the cell holder in the housing is possible. An appropriate cell holder can therefore be inserted into the housing of the battery pack only in a structurally predetermined rotational position.

Expediently, the positional securing element is configured on the open end face of the housing as a support sleeve into which a fastening screw of the housing cover can be screwed. The positional securing element is advantageously formed as a longitudinal guide rib that preferably is provided with a part-circular or bead-shaped cross-section and extends between the end faces of the housing in the longitudinal direction of the housing.

The cell holder has a guide section with which it is guided on the longitudinal guide rib so that several cell holders may be inserted in the longitudinal direction of the battery pack housing without there being the risk that the individual elements jam or assume a wrong position.

For guiding the battery pack housing in a compartment of a power tool, the sidewall of the battery pack housing is provided with external guide grooves that extend in the longitudinal direction of the housing between its end faces. The construction is advantageously such that the outer guide groove and the inner positional securing elements are positioned relative to one another such that the guide groove is physically embodied in the material of the positional securing element.

The parting line between cover and housing is advantageously at the level of a cell holder wherein a rim of the cell holder may cover face-to-face the area of the parting line between cover and housing and may cause a reinforcement of the housing section in the area of the parting line in this way.

Preferably, the cell holders that secure between them the cells are mechanically connected to one another, for example, by a screw connection. The battery cells that are fixedly and mechanically secured relative to one another by the cell holders form a cell container with a predetermined nominal voltage, that is varied as a function of the number of the battery cells and the type of connection of the battery cells (serial connection, parallel connection).

The housing of the battery pack can receive several such cell containers that are expediently stacked in the longitudinal direction of the housing and are, for example, electrically connected in series or parallel.

DESCRIPTION OF THE PREFERRED EMBODIMENTS

Figure 1:
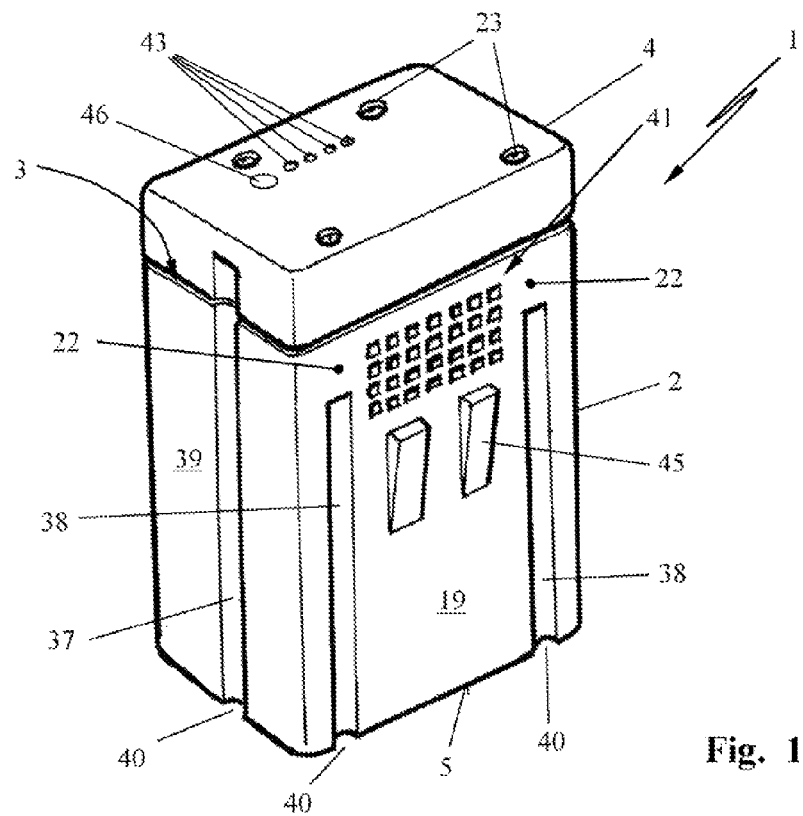
FIG. 1 is a perspective view of an exchangeable battery pack in accordance with the present invention.
Figure 2:
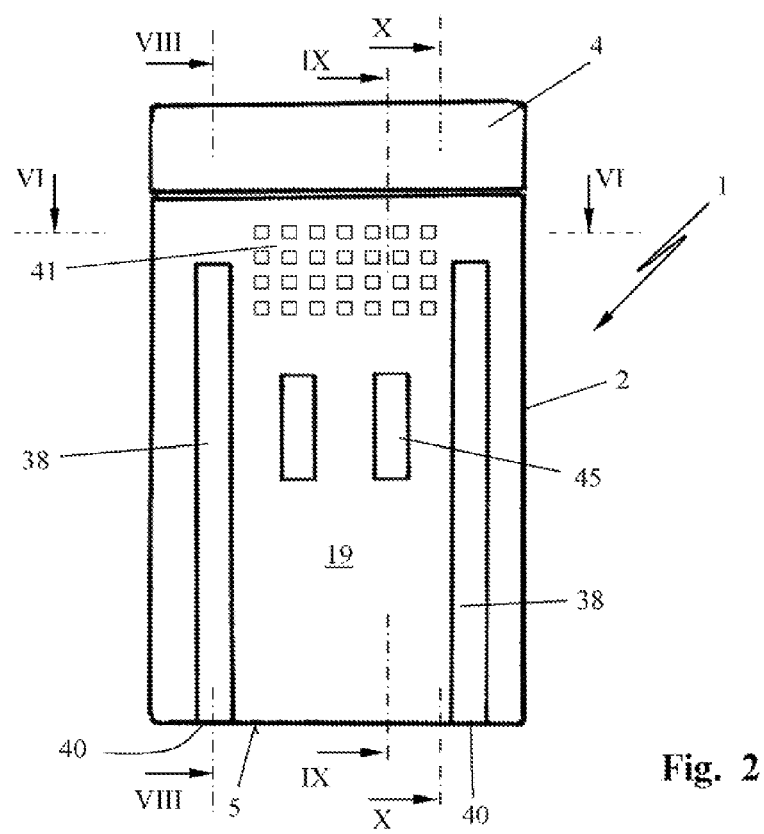
FIG. 2 is a view onto a wide sidewall of the battery pack according to FIG. 1.
Figure 3:
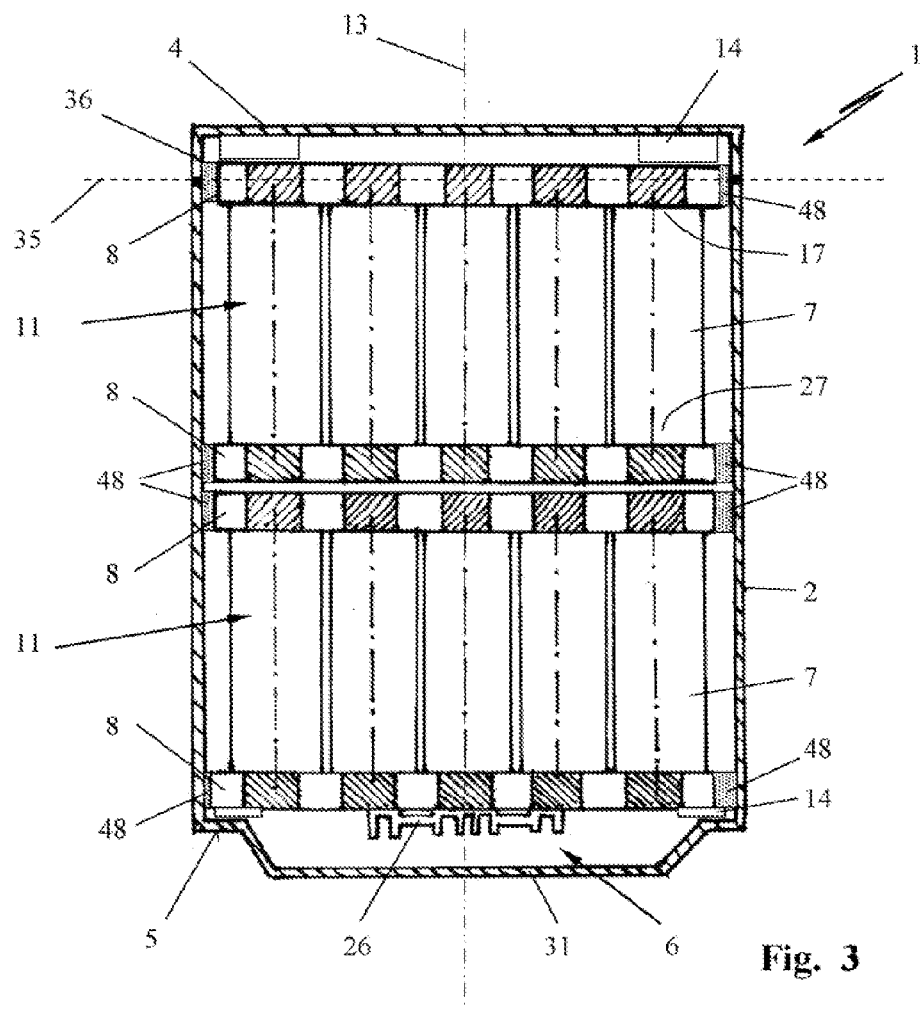
FIG. 3 is a longitudinal section of the battery pack.
Figure 4:
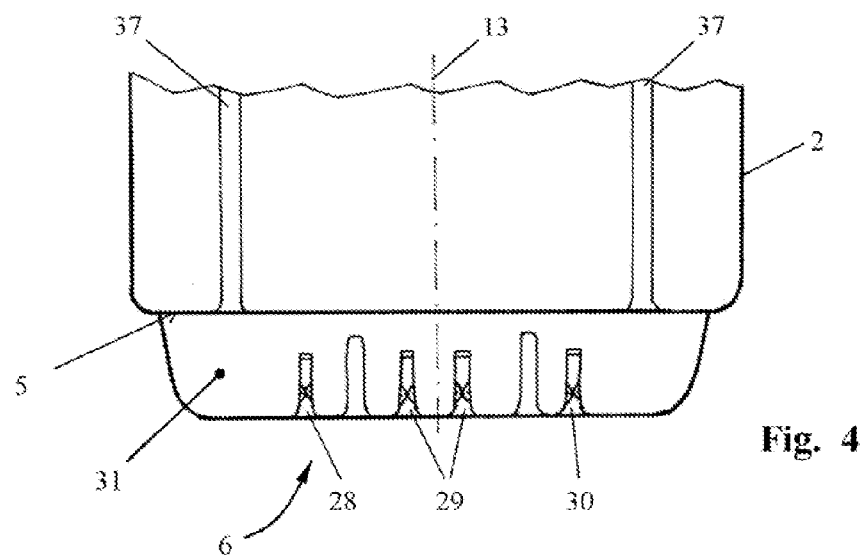
FIG. 4 is a view of the electrical connector on one end face of the battery pack.

FIGS. 1 to 3 show a battery pack 1 that can be inserted as an exchangeable energy source in the casing of an electric device, for example, a portable, hand-guided power tool. Such a power tool can be a hedge trimmer, a motor chain saw, a cut-off machine, a grass or brush trimmer, an edger, a pole pruner, a blower, a sprayer, a vacuuming device, an earth auger, a multi-task power tool with multi-functional attachments, a sweeper, a rotary hoe, a rototiller (cultivator), a high-pressure cleaning device, a lawnmower, a dethatcher, a shredder or chopper, a wet/dry vacuuming device, or a similar power tool.

The battery pack 1 is comprised in the illustrated embodiment substantially of a battery pack housing 2 that is of a parallelepipedal shape and has at least on one open end face 3. The open end face 3 is closed off by a housing cover 4. On the oppositely positioned end face 5 that is remote from the housing cover 4 and embodied in the illustrated embodiment as a closed end face, an external electrical connector 6 is provided by means of which the battery pack is connected to the electrical contacts of the electric device to be operated or connected to a recharging device for charging the battery cells 7 arranged in the housing 2 of the battery pack 1. By means of the external electrical connector 6 the groups of battery cells 7 arranged in the housing 2 of the battery pack 1 are thus charged or discharged.

Figure 6:
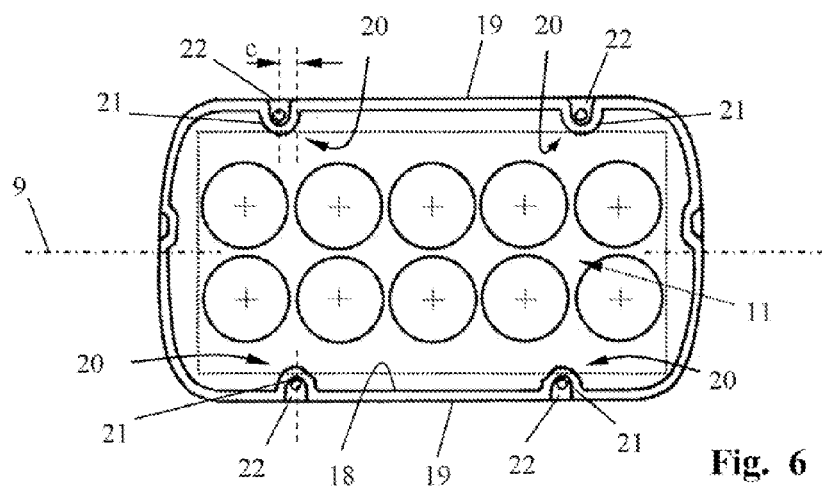
FIG. 6 is a schematic section view along the section line VI-VI of FIG. 2.

As shown in FIG. 3, the battery cells 7 are secured in the cell holders 8 for which purpose the ends 17, 27 of each battery cell 7 are secured in a receptacle 10 of a cell holder 8, respectively. The cell holder 8 engages like a cap the circumferential wall of the cells 7 at least partially. The receptacles 10 are formed in the bottom of a cell holder 8. In the illustrated embodiment, as shown in FIG. 6, ten cells 7 are provided in two rows of five cells each. In a plan view, the cells 7 are arranged symmetrical to a transverse axis 9 of the cell holder 8.

The cell holders 8 are embodied as identical parts. Two such cell holders 8 together with the individual cells 7 arranged between them form a cell container 11 that constitutes an assembly provided with electrical terminals.

The cell holders 8 are supported on one another by means of support sleeves 12 so that after joining the cell holders 8 that rest against one another the intermediately positioned cells 7 are secured at their ends 17, 27 and form a common mechanical unit. In the illustrated embodiment the cell holders 8 are screw connected by means of screws 23 engaging the support sleeves 12. Instead of screws 23 also plug connections or locking connections or snap connections can be expedient.

FIG. 3 shows that in the direction of the longitudinal axis 13 of the parallelepipedal battery pack 1 two cell containers 11 are stacked on top one another and secured between the closed end face 5 and the housing cover 4. It may be expedient to provide elastic bearing elements 14 between the end face 5 and the contacting lower cell container 11 as well as between the housing cover 4 and the upper cell container 11 so that the cell containers 11 are clamped between the end face 5 and the cover 4.

Figure 7:
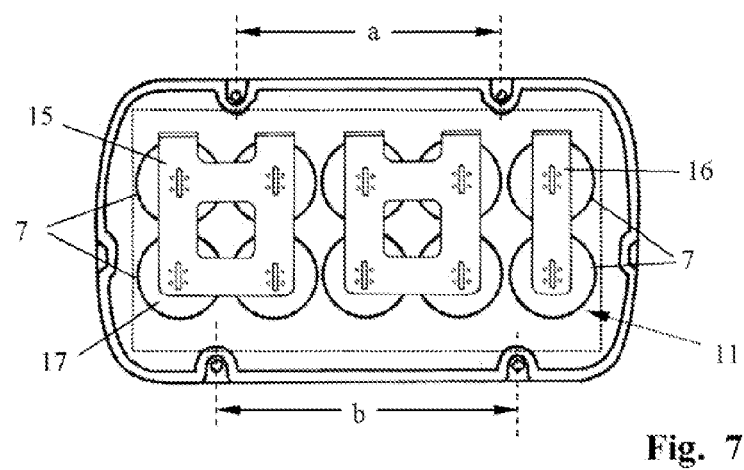
FIG. 7 is a view according to FIG. 6 with cell connectors arranged at the ends of the battery cells.

The battery cells 7 of a cell container 11, as shown in FIG. 7, are electrically connected to one another at their ends 17 and 27, respectively, by cell connectors 15, 16. The cell connectors 15, 16 are welded onto contacts of the cell ends 17, 27.

Figure 8:
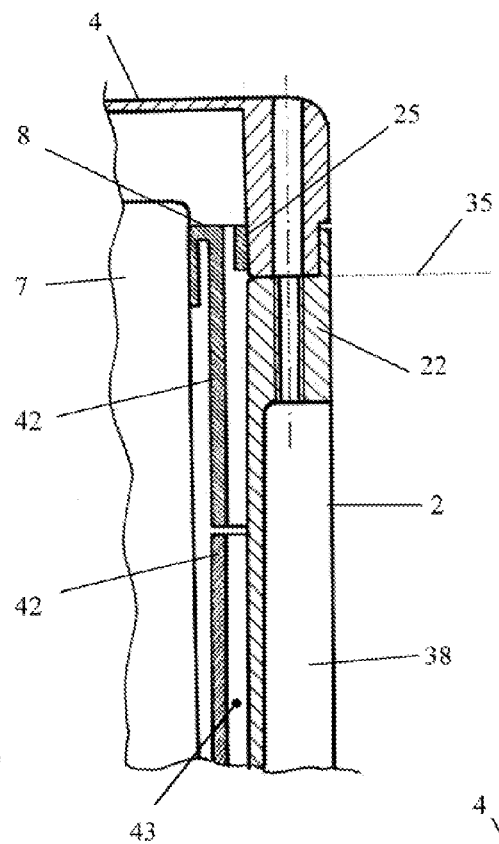
FIG. 8 is a section along the section line VIII-VIII of FIG. 2.

Each cell container 11 is secured in the battery pack housing 2 by at least one positional securing element 20. Such a positional securing element 20 is provided on the inner side 18 of a sidewall 19. Expediently, the positional securing element 20 is advantageously embodied as a continuous longitudinal guide rib 21; as shown in FIGS. 6 and 7, the guide rib 21 extends in the direction of the longitudinal center axis 13 between the end faces 3 and 5 of the housing 2. On the inner side 18 two parallel extending longitudinal guide ribs 21 are advantageously arranged that in cross-section are designed of a part-circular shape or a bead shape. Each longitudinal guide rib 21 ends at the open end face 3 of the battery pack housing 2 in a support sleeve 22 for at least one fastening screw 23 of the housing cover 4. The positional securing element 20 provided on the inner side 18 of a sidewall 19 is thus embodied at the open end face 3 of the battery pack 2 as a monolithically formed support sleeve 22 (FIG. 8).

As shown in FIGS. 6 and 7, for positional fixation of a cell container 11 on the wide sidewalls 19 several positional securing elements 20 are provided. In the illustrated embodiment on each sidewall 19 two longitudinal guide ribs 21 are formed that are parallel to one another. The longitudinal guide ribs 21 on one sidewall 19 have a smaller lateral spacing a relative to one another than the longitudinal guide ribs 21 of the oppositely positioned wide sidewall 19 that have a greater spacing b to one another. As shown in FIG. 6, the longitudinal guide ribs 21 of one sidewall 19 are therefore laterally displaced relative to the longitudinal guide ribs 21 of the other sidewall 19 by the spacing c. In this way, it is achieved that a cell holder 8 can be inserted only in a predetermined rotational position into the battery pack housing 2. As a result of the different spacings a, b of the guide ribs 21 provided on the sidewalls 19, the cell holder 8 can be inserted only in a structurally predetermined position because the guide sections 24 that are provided in the form of recesses on the rim 25 of the cell holders 8 have a corresponding spacing a, b.

Figure 5:
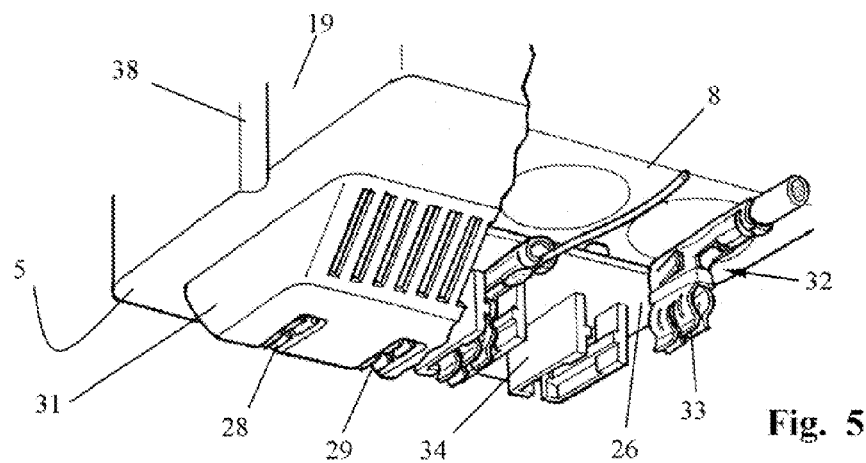
FIG. 5 is a perspective view of the electrical connector according to FIG. 4.

The cell container 11 resting against the closed end face 5 supports on its cell holder 8 a contact plate 26 that is accessible by means of corresponding slots 28, 29, 30 through the connector head 31 of the battery pack housing 2. In FIG. 5, the contact plate 26 that is supported on the lower cell holder 8 is shown; it is provided with contact clips 33 that are embodied on L-shaped cable terminals 32. The terminals 32 are secured in appropriate terminal receptacles 34 and can be contacted by means of access slots 28, 29 in the connector head 31 of the housing 2. The electric connector 6 is embodied as a plug contact and flat contacts can be inserted through the slots 28, 29, 30 in the direction of longitudinal center axis 13 into the contact clips 33 of the cable terminals 32. Expediently, the slots 28, 29 and 30 of the connector head 31 of the battery pack 2 are also open at an end face so that contacting of the battery pack contact clips 33 is possible also by insertion of a flat contact through the slots 28, 29 or 30 open at the end face.

The parting line 35 between the housing cover 4 and the battery pack housing 2 is positioned advantageously at the level of a cell container 11, expediently at the level of the cell holder 8 that is positioned directly adjacent to the housing cover 4. In this way, it is achieved that the housing cover 4 with its rim 36 engages the end of a cell container 11, i.e., engages the cell holder 8 so that a transverse fixation of the housing cover 4 by means of the cell holder 8 or the cell container 11 is realized. The cell container 11 bridges as a mechanically stable block the parting line 35 between the battery pack housing 2 and the housing cover 4 and thus provides a reinforcement.

The battery pack 1 has in the sidewalls 19, 39 at least one outer guide groove 37, 38 that serves for guiding the battery pack 1 within a compartment of a device housing, not illustrated, of an electric device to be operated by the battery pack. These outer guide grooves 37, 38 are open toward the lower end face 5. The open ends 40 of the outer guide grooves 37, 38 serve for threading the battery pack 1 onto the corresponding guide ribs in the device housing of a power tool. The guide grooves 38 of the wide sidewalls 19 of the parallelepipedal battery pack housing 2 are positioned at the same level as the inner positional securing elements 20 embodied as longitudinal guide ribs 21 so that the guide grooves 38 are physically embodied within the material of the longitudinal guide ribs 21 that are provided as positional securing elements 20. The guide grooves 38 that are open toward the connecting head 31 at the lower end face are closed off at their ends that are facing the housing cover 4 by means of a support sleeve 22 that receives a fastening screw 23 of the housing cover 4, respectively. It can be expedient, as illustrated with the aide of the guide groove 37, to extend the grooves into the housing cover 4. Routinely, the outer guide grooves 37 and 38 are formed such that they are open at their ends 40 that are facing the connector head at the end face 5 and are closed at their opposite ends that are facing the housing cover 4.

As shown in the FIGS. 1 and 2, it can be expedient to provide on one sidewall 19 of the battery pack 2 locking ramps 45 that serve for locking the battery pack 1 in a battery pack compartment of a power tool.

Moreover, one or several venting openings 41 can be expedient that may be formed in a wide and/or narrow sidewall 39, 19 of the battery pack housing 2.

FIGS. 8 through 11 show in section the position of a cell holder 8 and its supporting action provided for the battery pack housing 2.

In FIG. 8 the support sleeve 22 at the end of the guide groove 38 is shown wherein the cell holder 8 with its rim 25 rests above the parting line 35 against the housing cover 4 and in this way aligns it relative to the housing 2 of the battery pack 1. The cell holders 8 have moreover wall projections 42 that are projecting in the longitudinal direction of the battery pack housing 2 such that in the direction of longitudinal center axis 13 of the housing 2 they rest against one another to some extent. The projections 42 delimit together with the housing 2 a cable passage 43 for leads that are required for electrically connecting the cell container 11.

Figure 9:
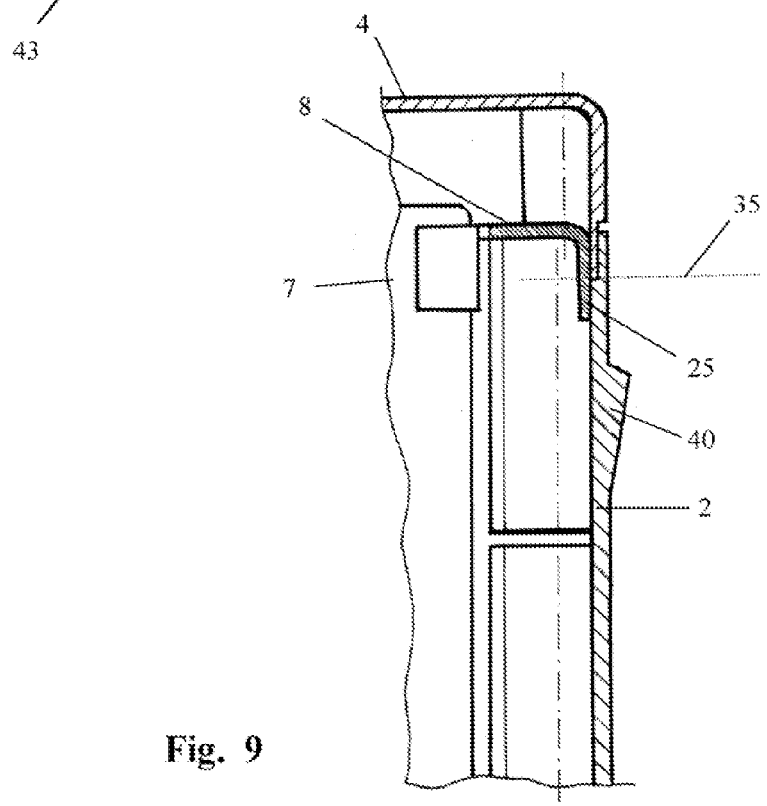
FIG. 9 is a section along the section line IX-IX of FIG. 2.
Figure 10:
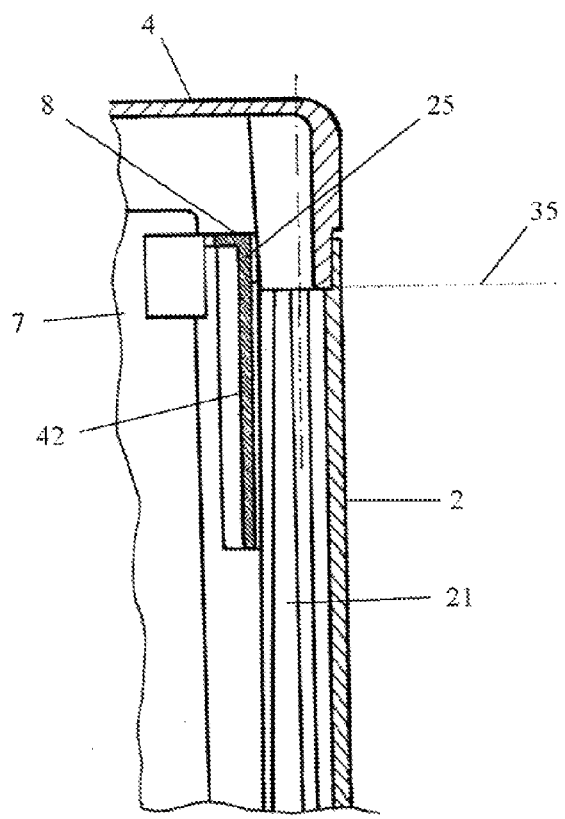
FIG. 10 is a section along the section line X-X of FIG. 2.

FIG. 9 shows that in a special embodiment of the present invention the rim 25 of the cell holder 8 is resting between the guide grooves 38 on the rim of the housing cover 4 as well as on the rim of the housing 2 so that it bridges in this way the parting line 35 between the housing cover 4 and the housing 2. In this way, a reinforcement of the battery pack housing 2 in the area of the parting line 35 is realized.

As shown in FIG. 3, a cell holder 8 can rest with its rim sections 48 on the inner wall of the battery pack housing 2 substantially without play so that the cell holder 8 itself acts as an inner reinforcement stay and protects the housing 2 of the battery pack 1 against deformation. As a result of the presence of the upper cell holder 8 at the level of the parting line 35 a reinforcement at the seam between housing 2 and housing cover 4 is realized so that transverse forces acting on the housing cover 4 are safely absorbed. The cell holder 8 is positioned with its circumferentially extending rim 25 on the circumferentially extending rim of the housing cover 4 so that it is provided with great stiffness, particularly between the force introduction points of the screw connections of the housing cover 4. The reinforcement of the housing 2 is also effected in the area of the locking ramps 45 to that locking and securing forces introduced in this area cannot effect a deformation of the housing 2, in this way a locking action at the housing and thus a secure hold of the battery pack 1 in a battery pack compartment is ensured.

Figure 11:
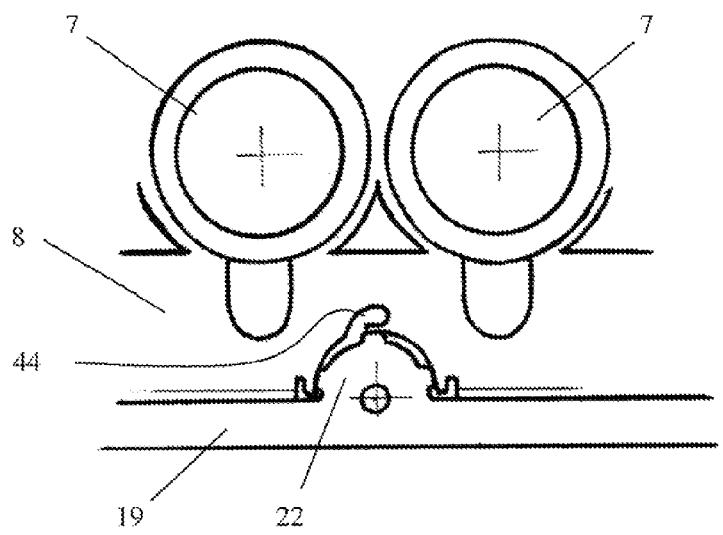
FIG. 11 is a schematic illustration of a detail of a cell holder guided on a guide rib.
Figure 12:
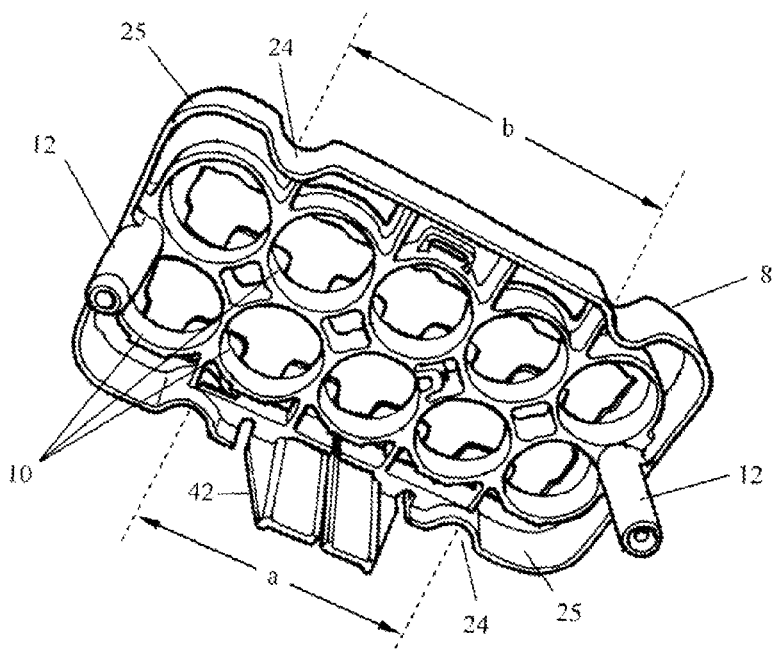
FIG. 12 is an interior view of a cell holder in perspective illustration.
Figure 13:
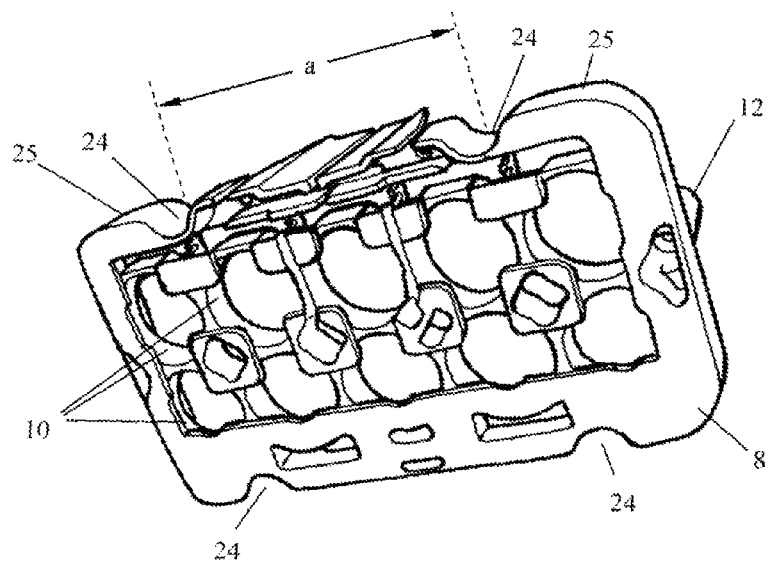
FIG. 13 shows the exterior of a cell holder in a perspective illustration.

As shown in FIG. 11, in the area of the support sleeve 22 a clamping projection 44 is formed that is deformable and compensates the play between housing 2 and cell holder 8 that exists because of the required demolding taper of the cup-shaped battery pack housing 2.

In the illustrated embodiment the cells 7 can be embodied as NiCd cells (nickel cadmium cells), NiMH cells (nickel metal hydride cells), Li-ion cells (lithium ion cells), LiPo cells (lithium polymer cells), LiFePO4 cells (lithium iron phosphate cells), lithium titanate cells or similar cells. Preferred are battery cells on the basis of lithium with a cell voltage between 2 volts to 5 volts, preferably with a cell voltage of approximately 3.6 volts to 3.7 volts. The cells 7 are electrically connected with one another such (serial connection, parallel connection) that the nominal voltage of the entire battery pack 1 is advantageously between 12' volts and 150 volts, preferably 25 volts to 50 volts, in particular 36 volts wherein an individual cell container 11 can have a nominal voltage of 18 volts. The cell containers 11 received in the battery pack housing 2 are advantageously electrically connected in series so that a battery pack voltage of 36 volts is achieved in the illustrated embodiment. The capacity of the battery pack according to the present invention is in the range of 2 Ah to 10 Ah.

In a preferred embodiment of the invention, in the housing cover 4 of the battery pack 1 a controlling and monitoring device is integrated that controls display elements 43, preferably LEDs, provided in the housing cover 4. The end face of the housing cover 4 remains visible to the operator in the operating position of the battery pack 1 inserted in the battery pack compartment of a power tool so that the operator by means of the display elements 43 can read information in regard to the state of the cells 7 of the battery pack 1 and by means of actuating element 46, for example, a push button, can initiate actions such as testing functions. For example, by means of the display elements 43 a retrieved charge state or discharge state of the cells 7 or a possible malfunction, the actual operating temperature of the cells or other operating and monitoring parameters can be displayed.

Figure 14:
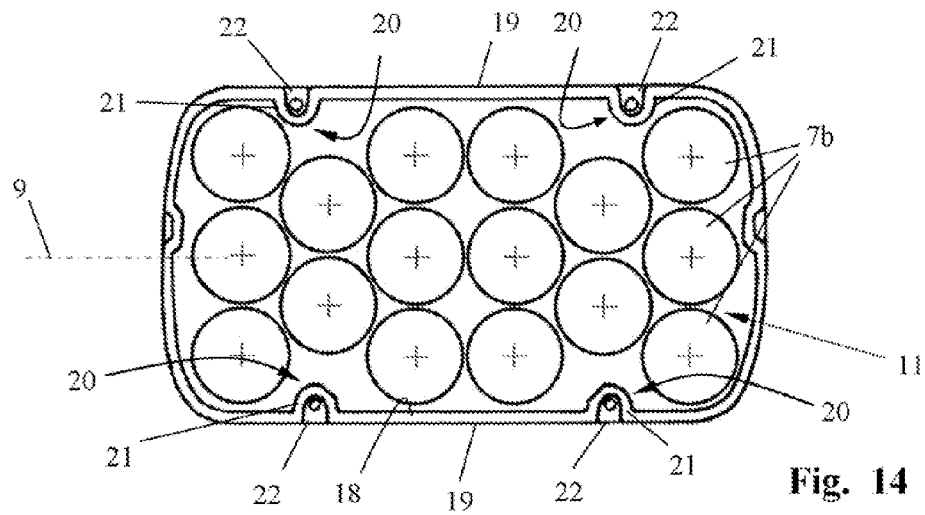
FIG. 14 is an alternative arrangement of individual battery cells in the battery pack housing.
Figure 15:
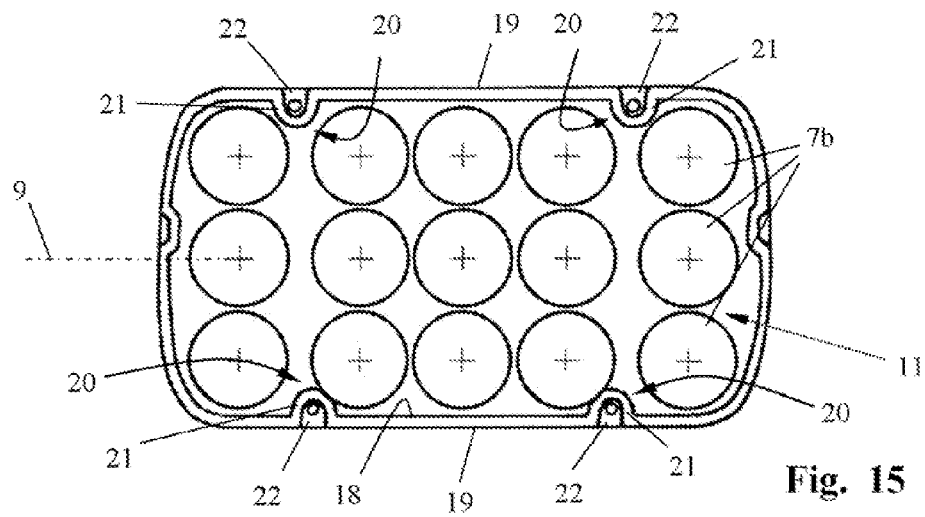
FIG. 15 shows a further alternative of the arrangement of battery cells in the battery pack housing.
Figure 16:
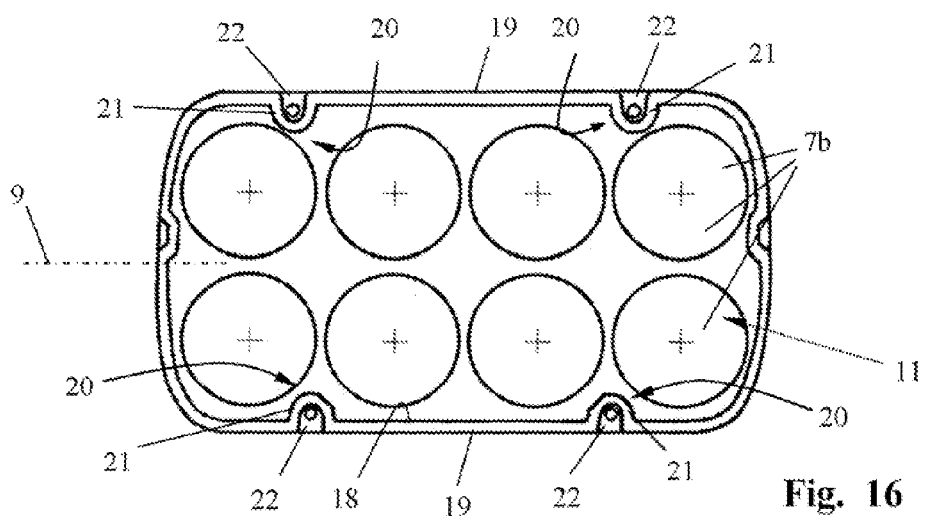
FIG. 16 shows another alternative of the arrangement of individual cells in the battery pack housing.

In the illustrations according to FIGS. 14 to 16 it is apparent that the battery pack housing is suitable for receiving different cell sizes and varying cell numbers. In FIG. 14 there are 16 cells so that an individual cell container 11 has a voltage of up to 52 volts. The arrangement of 3-2-3-3-2-3 provides in the area of the positional securing elements 20 free space that can also be used for passing the electrical leads through.

In the embodiment according to FIG. 15 five rows of three cells each are arranged adjacent to one another wherein in the area of the longitudinal grooves provided as positional securing elements free space is provided.

In the embodiment according to FIG. 16 eight cells are provided that have a greater capacity and thus may provide a battery pack with a nominal voltage of approximately 30 volts and high power.

The specification incorporates by reference the entire disclosure of German priority document 10 2009 012 183.8 having a filing date of Feb. 27, 2009.

While specific embodiments of the invention have been shown and described in detail to illustrate the inventive principles, it will be understood that the invention may be embodied otherwise without departing from such principles.

What is claimed is:

1. An exchangeable battery pack for an electric device, the battery pack comprising: a battery pack housing comprising a first end face and a second end face opposite said first end face, wherein said first end face is open; a housing cover closing off said first end face; battery cells disposed in said battery pack housing; cell connectors electrically connecting said cells with one another; an external electrical connector disposed on said second end face, wherein all of said battery cells are connected to said external electrical connector, wherein said battery cells are charged and discharged through said external electrical connector; a common cell holder disposed in an interior of said battery pack housing, wherein several of said battery cells are secured in said cell holder; inner positional securing elements connected to an inner side of opposed sidewalls of said battery pack housing and facing the interior of said battery pack housing; wherein said cell holder comprises a circumferentially extending rim comprised of four sides, wherein said rim comprises guide sections and said guide sections are recesses formed on two of said sides, said two sides positioned opposite each other on said rim; wherein said positional securing elements each are embodied as a longitudinal guide rib that extends between said first and second end faces in a direction of a longitudinal center axis of said battery pack housing; wherein said guide sections directly engage and are directly guided on said longitudinal guide ribs; wherein said positional securing elements on said opposed sidewalls are displaced relative to one another such that said cell holder is insertable only in a predetermined rotational position into said battery pack housing; wherein between said guide sections two locking ramps lock said battery pack compartment to the electrical device.

2. The battery pack according to claim 1, wherein said positional securing elements are embodied at said first end face as a support sleeve for said housing cover.

3. The battery pack according to claim 1, wherein in said sidewall of said battery pack housing an outer guide groove is physically formed that extends in a direction of a longitudinal center axis of said battery pack housing between said first and second end faces.

4. The battery pack according to claim 3, wherein said outer guide groove and a first one of said positional securing elements are positioned relative to one another such that said outer guide groove is formed within a material of said first positional securing element.

5. The battery pack according to claim 3, wherein said outer guide groove has an open end at said second end face.

6. The battery pack according to claim 3, wherein said outer guide groove is closed at said first end face by a support sleeve.

7. The battery pack according to claim 3, wherein several of said outer guide groove are provided on opposed sidewalls of said battery pack housing, wherein said guide grooves on said opposed sidewalls are laterally parallel displaced relative to one another.

8. The battery pack according to claim 1, wherein a parting line between said battery pack housing and said housing cover is positioned at a level of said cell holder.

9. The battery pack according to claim 8, wherein said rim of said cell holder covers said parting line.

10. The battery pack according to claim 1, wherein two of said cell holder are provided, wherein opposed ends of said battery cells are secured in said two cell holders, respectively, wherein said two cell holders are supported on one another and form a cell container.

11. The battery pack according to claim 10, wherein said two cell holders are screwed together.

12. The battery pack according to claim 10, wherein in said battery pack housing two of said cell containers are provided and stacked in a direction of a longitudinal center axis of said battery pack housing on top one another.

13. The battery pack according to claim 12, wherein said cell containers are electrically serially connected.

14. The battery pack according to claim 1, wherein a nominal voltage of the battery pack is approximately 36 volts.

15. The battery pack according to claim 1, wherein said battery cells are rechargeable lithium-based cells having a cell voltage between 2 volts and 5 volts.

16. The battery pack according to claim 15, wherein the cell voltage is between 3.6 volts and 3.7 volts.

17. An exchangeable battery pack for an electric device, the battery pack comprising: a battery pack housing comprising a first end face and a second end face opposite said first end face, wherein said first end face is open; a housing cover closing off said first end face; battery cells disposed in said battery pack housing; cell connectors electrically connecting said cells with one another; an external electrical connector disposed on said second end face, wherein all of said battery cells are connected to said external electrical connector, wherein said battery cells are charged and discharged through said external electrical connector; a common cell holder disposed in an interior of said battery pack housing, wherein several of said battery cells are secured in said cell holder; inner positional securing elements connected to an inner side of opposed sidewalls of said battery pack housing; wherein said cell holder comprises a circumferentially extending rim comprised of four sides, wherein said rim comprises guide sections and said guide sections are recesses formed on two of said sides, said two sides positioned opposite each other on said rim; wherein said positional securing elements each are embodied as a longitudinal guide rib that extends between said first and second end faces in a direction of a longitudinal center axis of said battery pack housing; wherein said guide sections directly engage and are directly guided on the longitudinal guide ribs; wherein said positional securing elements on said opposed sidewalls are displaced relative to one another such that said cell holder is insertable only in a predetermined rotational position into said battery pack housing; wherein in said sidewall of said battery pack housing an outer guide groove is physically formed on an exterior of the battery pack housing and extends in a direction of a longitudinal center axis of said battery pack housing between said first and second end faces; wherein said outer guide groove and a first one of said positional securing elements are positioned relative to one another such that said outer guide groove is formed within a material of said first positional securing element; wherein between said guide sections two locking ramps lock said battery pack compartment to the electrical device.

18. An exchangeable battery pack for an electric device, the battery pack comprising:
  a battery pack housing comprising a first end face and a second end face opposite said first end face, wherein said first end face is open;
  a housing cover closing off said first end face;
  battery cells disposed in said battery pack housing;
  cell connectors electrically connecting said cells with one another;
  an external electrical connector disposed on said second end face, wherein all of said battery cells are connected to said external electrical connector, wherein said battery cells are charged and discharged through said external electrical connector;
  two common cell holders disposed in an interior of said battery pack housing, wherein several of said battery cells are secured in said two cell holders and opposed ends of said battery cells are secured in said two cell holders, respectively, wherein said two cell holders are mechanically secured on one another and form a cell container;
inner positional securing elements connected to an inner side of opposed sidewalls of said battery pack housing and facing the interior of said battery pack housing;
wherein said two cell holders each comprise a circumferentially extending rim comprised of four sides, wherein said rim comprises guide sections and said guide sections are recesses formed on two of said sides, said two sides positioned opposite each other on said rim;
wherein said positional securing elements each are embodied as a longitudinal guide rib that extends between said first and second end faces in a direction of a longitudinal center axis of said battery pack housing;
wherein said guide sections directly engage and are directly guided on said longitudinal guide ribs;
wherein said positional securing elements on said opposed sidewalls are displaced relative to one another such that said two cell holders are insertable only in a predetermined rotational position into said battery pack housing.

* * * * *